(12) United States Patent
Doan et al.

(10) Patent No.: US 9,393,914 B2
(45) Date of Patent: Jul. 19, 2016

(54) EFFICIENT HOLDER FOR MOBILE DEVICES

(71) Applicants: Son Nam Doan, Santa Ana, CA (US); Nick Ngoc Nguyen, Silverado, CA (US)

(72) Inventors: Son Nam Doan, Santa Ana, CA (US); Nick Ngoc Nguyen, Silverado, CA (US)

(*) Notice: Subject to any disclaimer, the term of this patent is extended or adjusted under 35 U.S.C. 154(b) by 34 days.

(21) Appl. No.: 13/969,530

(22) Filed: Aug. 17, 2013

(65) Prior Publication Data

US 2015/0048643 A1 Feb. 19, 2015

(51) Int. Cl.
*B60R 11/02* (2006.01)
*B60J 3/02* (2006.01)
*B60R 11/00* (2006.01)

(52) U.S. Cl.
CPC ............ *B60R 11/02* (2013.01); *B60J 3/0282* (2013.01); *B60R 2011/0035* (2013.01); *B60R 2011/0071* (2013.01)

(58) Field of Classification Search
CPC ............ B60R 11/02; B60R 2011/0035; B60R 2011/0071; B60J 3/0282
USPC ......................................... 296/97.5
See application file for complete search history.

(56) References Cited

U.S. PATENT DOCUMENTS 3,426,911 A * 2/1969 Seiling .................. 211/13.1
4,781,409 A * 11/1988 Harbison ................ 296/97.6
5,402,924 A * 4/1995 Gilson ................... 224/312

* cited by examiner

*Primary Examiner* — Glenn Dayoan
*Assistant Examiner* — Melissa A Black

(57) ABSTRACT

One disclosed aspect of the embodiments is an apparatus to hold a mobile device in a vehicle. A sleeve is stretchable to fit longitudinally along a sun visor of a vehicle and having front and back surfaces. The front surface has a vent structure. A first strap is transversely attached on the front surface at a first side of the vent structure to hold a first end of a first device. A second strap is transversely attached on the front surface at a second side of the vent structure to adjustably hold a second end of the first device. The second side is opposite to the first side across the vent structure.

12 Claims, 4 Drawing Sheets

EFFICIENT HOLDER FOR MOBILE DEVICES

TECHNICAL FIELD

The presently disclosed embodiments are directed to the field of mobile devices, and more specifically, to holder for mobile devices.

BACKGROUND

Mobile technology has been important in the communication industry. Mobile devices such as cell phones and mobile computers have become increasingly popular. Consumers may carry their mobile devices anywhere while keeping connected to the world through WiFi hotspots and other wireless means. One particular usage of mobile devices is in vehicles. An example of such usage is using mobile phones while driving. In some jurisdictions, such usage is illegal, but not all jurisdictions ban phone use while driving completely. In addition, phone use while driving may be necessary in cases of emergency.

A number of techniques have been developed to facilitate the use of mobile devices in vehicles. Bluetooth technology allows hands-free communication by wireless connection to cell phone using a specially designed kit. By integrating the wireless functionality into an in-vehicle stereo system, a driver can communicate with another person through the stereo speakers. However, not all vehicles can be equipped with these kits. Furthermore, there is still a need to keep the mobile device in a ready-to-use location within the driver's reach.

SUMMARY

One disclosed feature of the embodiments is an apparatus to hold a mobile device in a vehicle. A sleeve is stretchable to fit longitudinally along a sun visor of a vehicle and having front and back surfaces. The front surface has a vent structure. A first strap is transversely attached on the front surface at a first side of the vent structure to hold a first end of a first device. A second strap is transversely attached on the front surface at a second side of the vent structure to adjustably hold a second end of the first device. The second side is opposite to the first side across the ventstructure.

BRIEF DESCRIPTION OF THE DRAWINGS

Embodiments may best be understood by referring to the following description and accompanying drawings that are used to illustrate embodiments. In the drawings.

DETAILED DESCRIPTION

One disclosed feature of the embodiments is an apparatus to hold a mobile device in a vehicle. A sleeve is stretchable to fit longitudinally along a sun visor of a vehicle and having front and back surfaces. The front surface has a vent structure. A first strap is transversely attached on the front surface at a first side of the vent structure to hold a first end of a first device. A second strap is transversely attached on the front surface at a second side of the vent structure to adjustably hold a second end of the first device. The second side is opposite to the first side across the vent structure.

Another disclosed feature of the embodiments is a sun visor to hold a mobile device in a vehicle. A platform has front and back surfaces and a side that fits longitudinally a shaft behind a windshield of a vehicle. The shaft is rotatable on a horizontal surface with respect to roof of the vehicle. The front surface has a vent structure. A first strap is transversely attached on the front surface at a first side of the vent structure to hold a first end of a first device. A second strap is transversely attached on the front surface at a second side of the vent structure to hold a second end of the first device. The second side is opposite to the first side across the vent structure.

In the following description, numerous specific details are set forth. However, it is understood that embodiments may be practiced without these specific details. In other instances, well-known structures, and techniques have not been shown to avoid obscuring the understanding of this description.

One disclosed feature of the embodiments may be described by a schematic drawing depicting a physical structure. It is understood that the schematic drawing illustrates the basic concept and may not be scaled or depict the structure in exact proportions.

Figure 1:
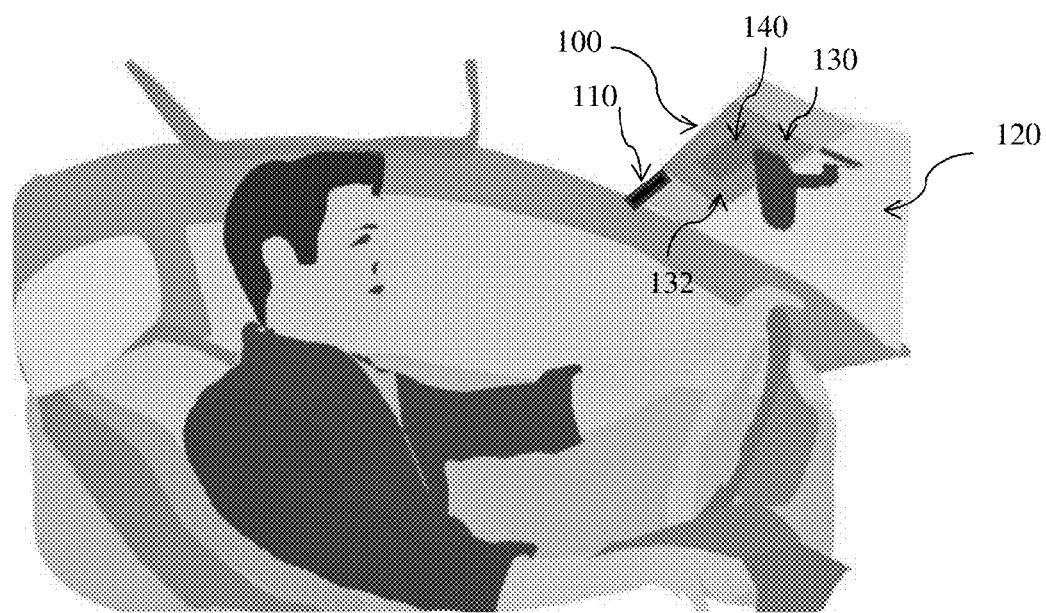
FIG. 1 is a diagram illustrating a sun visor in a front position according to one embodiment.

FIG. 1 is a diagram illustrating a sun visor 100 in a front position according to one embodiment. The sun visor 100 is used to reduce or block incident light that may impair the driver's or passenger's visual field. It is shown at the driver's side, but it may be at the passenger's side. It is installed on a pivot arm or shaft 110 that is rotatable around a pivot point fixed at the corner of the roof of the vehicle. In the front position, it is behind a windshield 120. Through the pivot arm 110, the sun visor 100 may be put in any suitable position. When not in used, it is typically pushed up to face the roof. In normal operation, it may be pushed to press against the windshield 120 to rest on the slanted surface of the windshield 120. It may be moved around the pivot arm to occupy any desired position that the driver or the passenger feels comfortable with.

The sun visor 100 is enclosed partially by a device holder 130. The device holder 130 has a front surface 132 and a back surface 134. The device holder 130 may hold a mobile device 140 on the front surface 132 or the back surface 134 depending on the user's preference. The device holder 130 may also hold an accessory such as a mirror or a notepad. Depending on whether the sun visor 100 is at the driver's side or the passenger side, the mobile device 140 may be used by the driver or the passenger. The device holder 130 may be removed from the sun visor 100 when it is not needed.

The mobile device 140 may be any mobile device such as a cell phone, a hand-held computer, a tablet computer, an electronic device, a camera, a personal digital assistant (PDA), a media device, a game device, etc. In one embodiment, the mobile device 140 is a cellular phone having a flat display and keyboard and other cellular functionalities. The keyboard may be a touch key or a tactile keyboard. When the sun visor 100 rests on the slanted surface of the windshield 120, the user (e.g., the driver or the passenger) may touch or press the keyboard using the slanted surface of the windshield 120 as the platform to provide the ground reaction force. In this position, the user may easily use the mobile device 140 by contact force because the mobile device 140 is within the arm reach of the user. The mobile device 140 may have a speaker so that the user can listen to sounds (e.g., voice, music) generated from the mobile device 140. The mobile device 140 may also have a microphone to allow the user to speak to a remote caller. Since the mobile device 140 is held in front of the driver, the driver can interact with it without taking his or her eyes off the road and therefore distraction from driving may be avoided.

Figure 2:
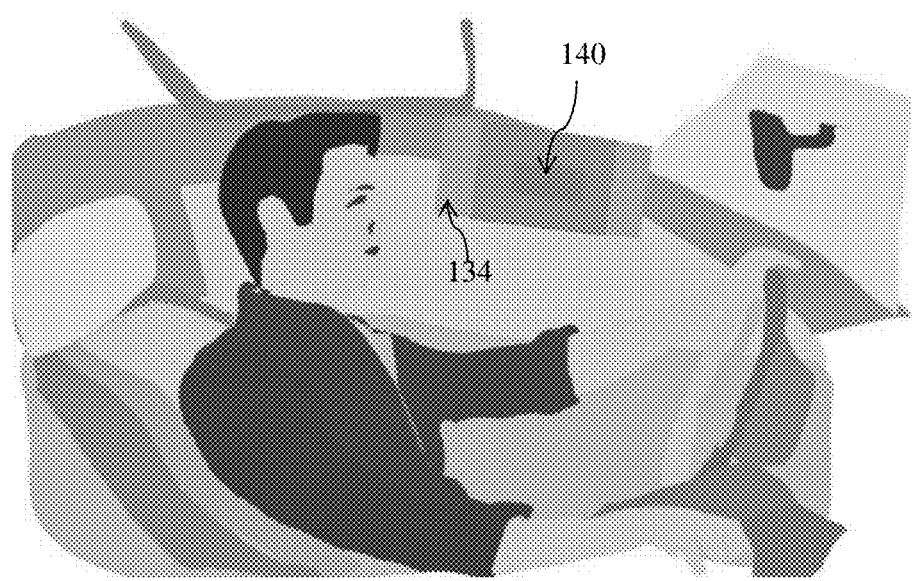
FIG. 2 is a diagram illustrating a sun visor in a side position according to one embodiment.

FIG. 2 is a diagram illustrating a sun visor 100 in a side position according to one embodiment. When the sun visor 100 is moved to the side position, the back surface of the device holder 130 faces the left side of the driver, or the right side of the passenger if it is at the passenger's side. The back surface of the device holder 130 may hold the mobile device 140 or another device, such as a media device. At this position, the mobile device 140 is closer to the user's ear than the front position. Accordingly, the user may listen to sounds generated from the mobile device 140 with better clarity.

Figure 3:
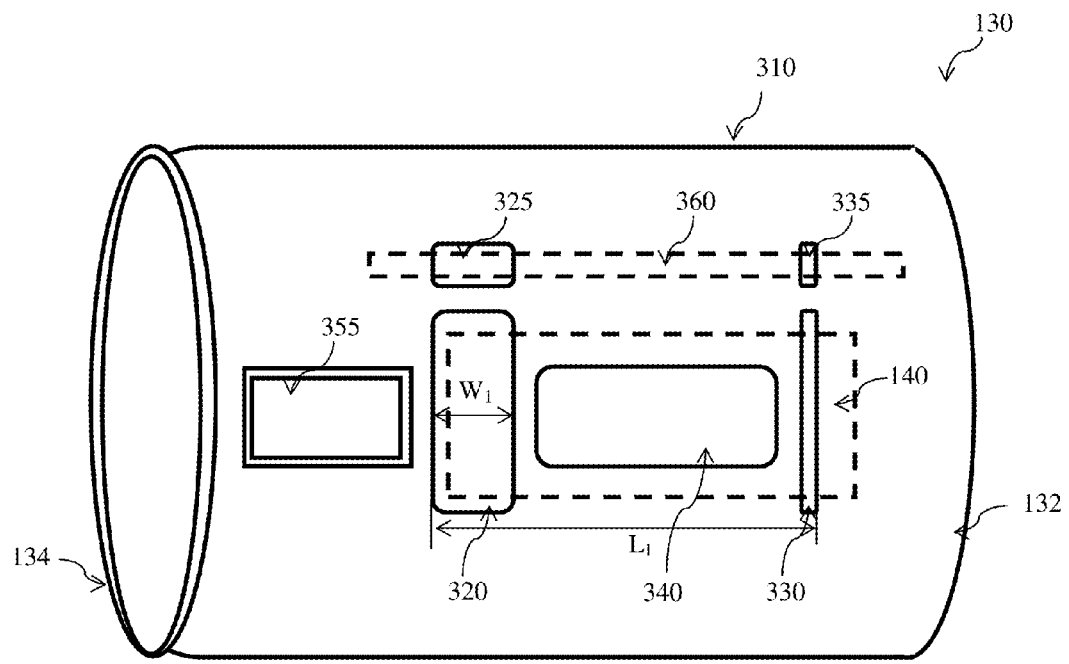
FIG. 3 is a diagram illustrating the device holder according to one embodiment.

FIG. 3 is a diagram illustrating the device holder 130 according to one embodiment. The device holder 130 may be sized to fit the sun visor 100. It may have a sleeve 310, a first strap 320, and a second strap 330.

The sleeve 310 is stretchable to fit longitudinally along the sun visor 100 of the vehicle. It may be made of any suitable elastic material that may be stretched to cover the sun visor 100 and firmly hold on the sun visor 100. In one embodiment, it may be made of elastic material such as neoprene or an elastic nylon webbing material.

In a typical configuration, the sleeve 310 slides onto the sun visor 100 in the longitudinal direction. Since the sun visor 100 is normally fastened to the pivot arm 110 in the longitudinal direction, the sleeve 310 is able to clasp firmly around the sun visor 100. The sleeve 310 has a front surface 132 and a back surface 134. When the sun visor 100 is rotated to occupy the position in front of the user, either the driver or the passenger), the front surface 132 faces the driver and the back surfaces face the windshield. When the sun visor 100 is rotated to occupy the position on the side of the user, the front surface 132 faces the side of the user and the back surface 134 faces the outside of the vehicle.

The front surface 132 has a vent structure 340 to provide ventilation for the mobile device 140 and to dissipate the heat generated by the electronic components of the mobile device 140. It may also allow audio signals to be transmitted without much obstruction. The vent structure 340 may have any convenient shape and size. In addition, there may be more than one vent structure. The vent structure 340 may be an opening, a raised surface, a perforated surface, or any structure that provides ventilation and/or heat dissipation for the mobile device 140. In one embodiment, the vent structure 340 is an opening which has a shape that is similar to the shape of the mobile device 140 such as rectangle. In another embodiment, the vent structure 340 is a raised surface on which the mobile device 140 is located. The raised surface may be shaped according to the shape of the mobile device 140. The height of the raised surface may range from one millimeter to less than one centimeter.

The first strap 320 is transversely attached on the front surface 132 at a first side of the vent opening 320 to hold a first end of the mobile device 140. In one embodiment, the first strap 320 may form a pocket having a cavity that fits the thickness of the mobile device 140. The pocket may be slightly larger than the second strap 330 so that it can hold firmly the mobile device 140. Its width $W_1$ may range from one-tenth to one-fourth of the end-to-end distance $L_1$ between the first strap 320 and the second strap 330.

The first strap may be extended transversely to form a first loop 325 to hold one end of an accessory device 360. The accessory device 360 may be any suitable device that fits along the longitudinal side of the sleeve 310. In one embodiment, the accessory device 360 is a pen, a pencil, or a stylus.

The second strap 330 is transversely attached on the front surface 132 at a second side of the vent opening 340 to adjustably hold a second end of the mobile device 140. The second side is opposite to the first side across the vent opening 340. The second strap 330 may be made by an elastic material so that it may be stretched as necessary to hold the mobile device 140. The second trap may be extended transversely to form a second loop 335 to hold other end of the accessory device 360.

One of the first and second straps 320 and 330 or both of them may be made of elastic materials such as neoprene or a thick elastic nylon webbing material.

In addition, the sleeve 310 may optionally have a slot or an area 350 on the front surface, sized to accommodate an accessory 355 such as a minor or a mini note pad and located next to the first strap 320 or the second strap 330.

Figure 4:
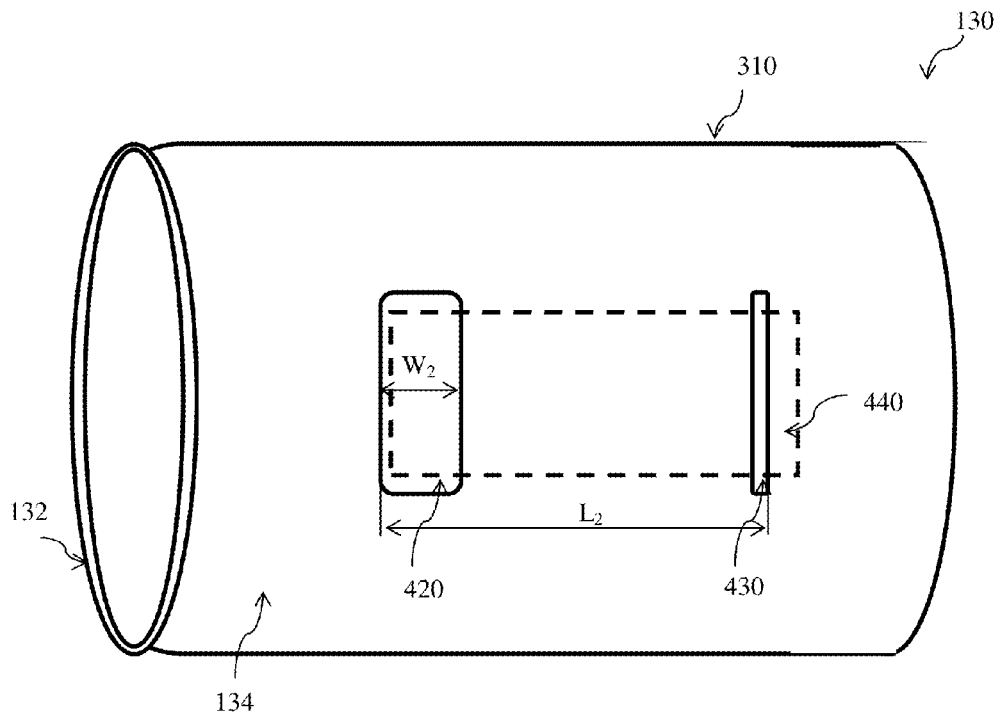
FIG. 4 is a diagram illustrating a back surface of a sleeve of the device holder according to one embodiment.

FIG. 4 is a diagram illustrating the back surface 134 of the sleeve 310 according to one embodiment. On the back surface, there may be a third strap 420 and a fourth strap 430. The back surface 134 may hold another device 440 in addition to, or instead of, the mobile device 140. The device 440 may be an accessory item such as a mirror, a pair of eyeglasses, or a mini note pad. The configuration of the third strap 420 and a fourth strap 430 may be similar to that of the first strap 320 and second strap 330 on the front surface 132. The third strap 420 is transversely attached on the back surface 134 at a first side to hold a first end of the device 440. The fourth strap 430 is transversely attached on the back surface 134 at a second side to hold a second end of the device 440. In one embodiment, the third strap may form a pocket having a cavity that fits the thickness of the device 440. The pocket may be slightly larger than the fourth strap 430 so that it can hold firmly the device 440. Its width $W_2$ may range from one-tenth to one-fourth of the end-to-end distance $L_2$ between the third strap 420 and the fourth strap 430.

Figure 5A:
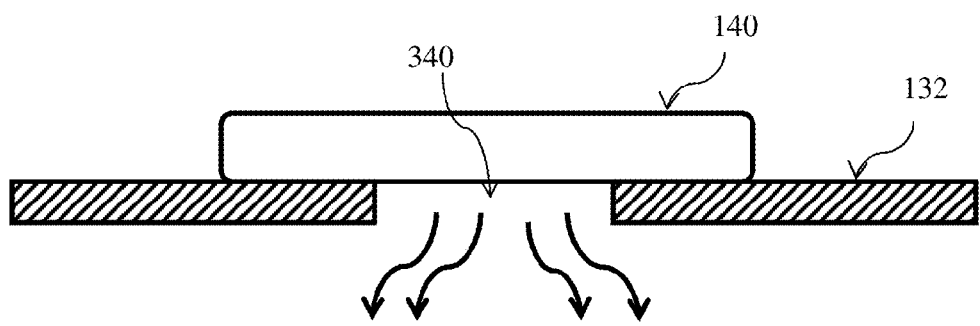
FIG. 5A is a diagram illustrating a vent opening for the vent structure according to one embodiment.

FIG. 5A is a diagram illustrating a vent opening for the vent structure 340 according to one embodiment. The vent structure 340 may be implemented by an opening or a hole on the front surface 132 or the entire sleeve 310. The opening is sufficiently sized to allow ventilation or heat dissipation for the mobile device 140. There may be one or more openings on a perforated surface underneath the mobile device 140.

Figure 5B:
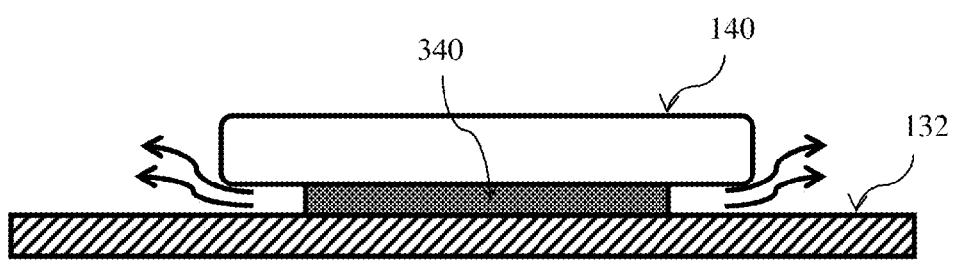
FIG. 5B is a diagram illustrating a raised surface for the vent structure according to one embodiment.

FIG. 5B is a diagram illustrating a raised surface for the vent structure 340 according to one embodiment. The vent structure 340 may be implemented by a raised surface on the front surface 132. The height of the raised surface is sufficiently sized to allow ventilation or heat dissipation for the mobile device 140. In one embodiment, the height may range from one millimeter to less than one centimeter.

Figure 6:
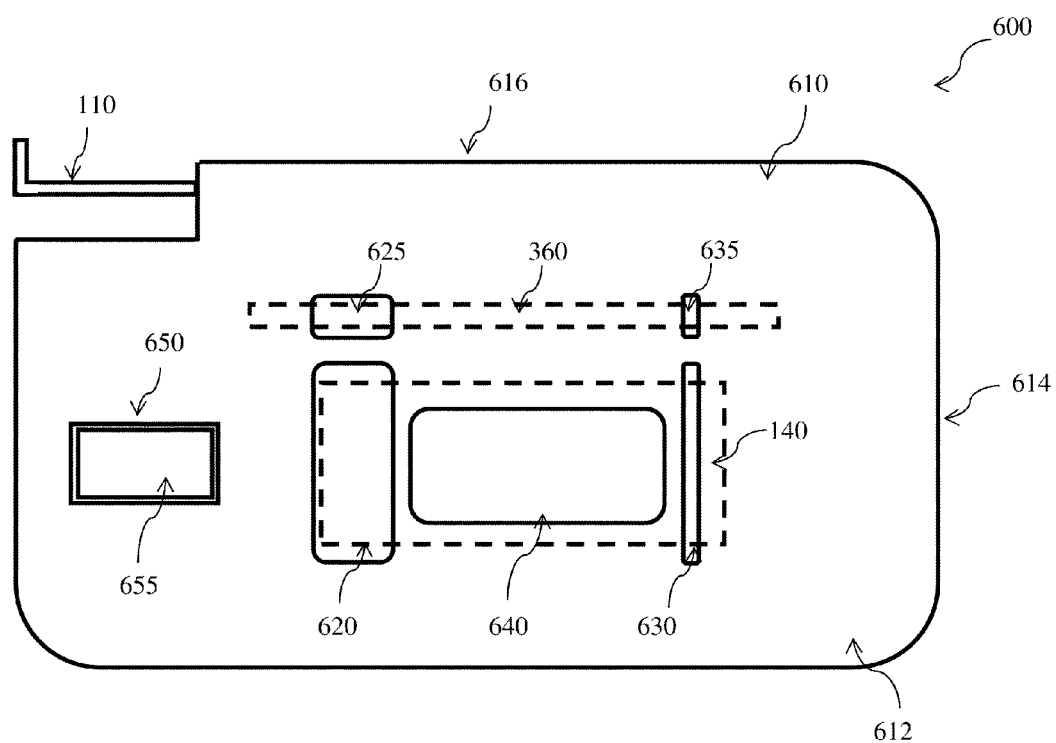
FIG. 6 is a diagram illustrating a sun visor with integrated device holder according to one embodiment.

FIG. 6 is a diagram illustrating a sun visor 600 with integrated device holder according to one embodiment. The sun visor 600 may have a platform 610, a first integrated strap 620, and a second integrated strap 630. The configuration of the first integrated strap 620 and the second integrated strap 630 may be similar to that of the first strap 320 and the second strap 330 shown in FIG. 3. The difference is that the first and second integrated straps 620 and 630 are integrated into the platform 610. The first and second integrated straps 620 and 630 may be made of elastic materials similar to the straps 320 and 330 shown in FIG. 3. Alternatively, they may be made of plastic materials such as Acrylonitrile Butadiene Styrene (ABS).

The platform 610 may have a front surface 612 and a back surface 614 and a side 616 that fits longitudinally the pivot arm 110 behind a windshield of a vehicle. The pivot arm 110 is rotatable on a horizontal surface with respect to roof of the vehicle. The front surface 612 may have a vent structure 640 similar to the vent structure 340 in FIG. 3. The platform 610 may be made from a molded foam core with Vinyl overlay materials or polyester cloth.

Since the sun visor 600 may be made with integrated device holder, the platform 610 may be implemented with additional hooks or clipping elements to hold the device 140 with or without the first and/or second traps 620 and 630. The device 140 may be a mobile device (e.g., a cell phone) or any other items such as a pair of eye glasses. When the device 140 is a pair of eye glasses, the first and second straps 620 and 630 may not be necessary. Instead, a hook or a clipping element may be used to hold the pair of eye glasses.

The first strap 620 is transversely attached on the front surface 612 at a first side of the vent structure 640 to hold a first end of the device 140.

The second strap 630 is transversely attached on the front surface 612 at a second side of the vent opening 640 to hold a second end of the device 140. The second side is opposite to the first side across the vent structure 640. The second strap 630 may be made of an elastic material so that it may be stretched as necessary to firmly hold the device 140.

The first integrated strap 620 may be extended transversely to form a first integrated loop 625 to hold one end of the accessory device 360. The second integrated trap 630 may be extended transversely to form a second loop 635 to hold other end of the accessory device 360. Alternatively, the loops 625 and 635 may be replaced by hooks that may be slightly bent to provide a snap-on action when the accessory device 360 is inserted.

In addition, the platform 610 may optionally have a slot or an area 650 on the front surface 612, sized to accommodate an accessory item 655 and located next to the first integrated strap 620 or the second integrated strap 630. The accessory item 655 may be a minor, a pair of eyeglasses, or a mini note pad.

The first and second straps 620 and 630 may be integrated within the platform 610. They may be implemented by any suitable method. For example, the platform 610 may be molded to provide a hollow surface onto which the device 140 may be installed. The first and second straps 620 and 630 may be hooks, clipping elements, or locks integral to the platform.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus comprising:
   a sleeve stretchable to fit longitudinally along a sun visor of a vehicle and having front and back surfaces, the front surface having a vent structure shaped to accommodate a first device, wherein the vent structure is a raised surface which holds the first device away from the front surface of the sleeve;
   a first strap transversely attached on the front surface at a first side of the vent structure to hold a first end of the first device; and
   a second strap transversely attached on the front surface at a second side of the vent structure to adjustably hold a second end of the first device, the second side being opposite to the first side across the vent structure.

2. The apparatus of claim 1 wherein the first strap forms a pocket having a cavity that fits thickness of the device.

3. The apparatus of claim 1 wherein the sleeve is made of an elastic material.

4. The apparatus of claim 1 wherein the second strap is made of an elastic, material.

5. The apparatus of claim 1 wherein the first device is a mobile device.

6. The apparatus of claim 1 further comprising:
   a slot or an area on the front surface, sized to accommodate an accessory item and located next to the first strap or the second strap.

7. The apparatus of claim 1 wherein the first strap is extended transversely to form a first loop to hold one end of a second device, and the second trap is extended transversely to form a second loop to hold other end of the second device.

8. The apparatus of claim 1 further comprising:
   a third strap transversely attached on the back surface at a first side to hold a first end of a third device; and
   a fourth strap transversely attached on the back surface at a second side to hold a second end of the third device.

9. A sun visor comprising:
   a platform having front and back surfaces and a side that fits longitudinally a shaft behind a windshield of a vehicle, the shaft rotatable on a horizontal surface with respect to roof of the vehicle, the front surface having a vent structure shaped to accommodate a first device, wherein the vent structure is a raised surface which holds the first device away from the front surface of the platform;
   a first strap transversely attached on the front surface at a first side of the vent structure to hold a first end of the first device; and
   a second strap transversely attached on the front surface at a second side of the vent structure to hold a second end of the first device, the second side being opposite to the first side across the vent structure.

10. The sun visor of claim 9 wherein the first device is a mobile device.

11. The sun visor of claim 9 further comprising:
    a slot or an area on the front surface, sized to accommodate a mirror and located next to the first strap or the second strap.

12. The sun visor of claim 9 wherein the first strap is extended transversely to form a first loop or hook to hold one end of a second device, and the second trap is extended transversely to form a second loop or hook to hold other end of the second device.

* * * * *